Patented Jan. 1, 1924.

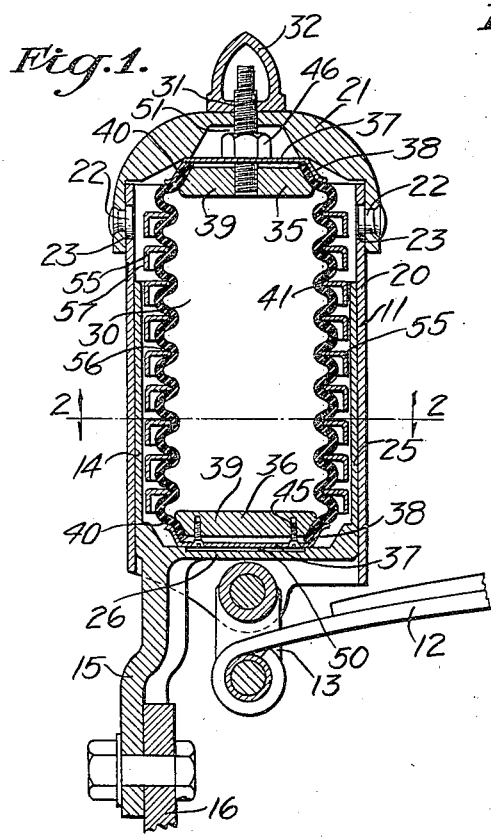

1,479,282

UNITED STATES PATENT OFFICE.

BRUCE BURNS, OF ALHAMBRA, CALIFORNIA.

AIR-CUSHION SHOCK ABSORBER.

Application filed September 3, 1921. Serial No. 498,219.

*To all whom it may concern:*

Be it known that I, BRUCE BURNS, a citizen of the United States, residing at Alhambra, in the county of Los Angeles and State of California, have invented a new and useful Air-Cushion Shock Absorber, of which the following is a specification.

This invention relates to devices by which shock caused by the sudden application of a force to an object may be minimized in its transmission to another object associated therewith and is particularly applicable to use on automobiles.

It is common practice to supply automobiles and other vehicles with so called shock absorbers and particularly with shock absorbers using air as a resilient medium. It is further old to confine this air in flexible containers usually of rubber which are longitudinally compressed upon the application of force thereto. It is further old to provide corrugations in these flexible containers for the purpose of increasing their flexibility and prolonging their useful life in service. It is further old to apply to these corrugations metal or other rings for the purpose of resisting the bursting pressures and it is old to place such flexible containers in cylindrical metal casings which serve to protect them.

It is, however, an object of my invention to provide a shock absorber of this class in which the metal casing is used as a guide and support for the flexible member and in which the metallic rings used to bursting pressures are also utilized to prevent wearing of the flexible member due to its rubbing on the metal casing.

Other objects and advantages will be made evident hereinafter.

Referring to the drawing which is for illustrative purposes only:

Fig. 1 is a sectional view through a shock absorber embodying my invention.

Fig. 2 is a cross section on a plane represented by the line 2—2 of Fig. 1.

Fig. 3 is a view illustrating one of the steps I employ in making the expansible container.

Fig. 4 is a detail view partially in section illustrating the manner in which the confining rings are placed abut the expansible container and the corrugations formed in the wall structure of the container.

Fig. 5 is a detail section showing a form of expansible container head suitable for high pressure conditions.

In the drawing I show my invention in a form applicable to use upon automobiles, the outer casing 11 thereof being attached to a spring 12 through a link 13, and the inner casing 14 being provided with an extending arm 15 for bolting to a suitable axle lug 16. The casing 11 is formed of a length of metal tubing 20 having secured thereupon a head 21 by means of lugs 22 which operate in suitable bayonet slots 23 formed in the tubing 20. The casing 14 consists of a tubular wall structure 25 of a size workable within the tubing 20, having associated therewith a head 26 from one side of which extends the arm 15.

Within the casings I situate an expansible container 30 into which air is introduced, under suitable compression to meet the conditions of loading, through a valve stem 31 extending through the head 21, and having a cap 32 threaded thereupon. This container 30 is so constructed that the therein contained compressed air will cause its expansion against the heads 21 and 26, and the force exerted thereby will tend to cause the separation of the heads to the extent that the head 26 will be brought against the link 13 as shown in Fig. 1.

The heads 35 and 36 forming the ends of the container 30 are composed of cups 37 having angularly disposed sides 38, in which cups are wedge discs 39. Between the edges of the discs 39 and the sloping walls 38 of the cups 37 are gripped the ends 40 of a corrugated flexible tube 41. The lower disc 39 is secured in place within the lower cup 37 by screws 45, while the upper disc 39 is maintained in position within the upper cup 37 by a nut 46 which screws down upon the valve stem 31 threaded into the upper disc 39 and extending through the upper cup 37. The compressive action exerted upon the ends 40 of the tube 41 effectually prevents any escape of air at these points, and it will be seen that the pressure of the air within the container will exert a further compressive force against the discs 39 which would cause the heads of the screws 45 to be projected from the bottom of the lower cup and the valve stem 31 to be forced slightly upward through the cup 37. In order to provide for the movement of these parts a recess 50 is formed in the head 26 and clearance 51 is provided above the nut 46.

The lateral expansion of the tube 41 is exerted against a number of rings 55 resting in the valleys 56 formed between the corrugations in the tube 41 and frictional contact between the tube 41 and the walls of the surrounding casings is prevented. I shape the rings 55 in the angular form shown to give a broad surface 57 in contact with the inner surfaces of the walls of the casing 14, thus maintaining the rings in perpendicular position with reference to these interior walls. The legs 57 of the angularly formed rings serve also as stops to limit the extent of flexure to which each of the corrugations may be subjected by coming to rest against the upper edge of each preceding ring.

In Figs. 3 and 4 is illustrated the method I have devised for the construction of the expansible member 30. The tube 41 is preferably formed by wrapping a layer of raw rubber 60 around a mandrel 61, and upon the layer of rubber 60 subsequently wrapping thereupon a reinforcing fabric 62 consisting of a composition of paralleled cotton strands and raw rubber such as is commonly used in the manufacture of tires. The tube 41 is then of such a size that it may be placed within the rings 55 as shown in Fig. 4. The heads 35 and 36 are then placed upon the ends 40 of the tube 41 and the entire arrangement of parts is placed in a frame consisting of a pair of plates 70 and 71 held in spaced relationship by bolts 72 which have the further utility of maintaining the rings 55 in alignment. Air is then introduced through the valve stem 31 and the tube 41 is forced out between the rings as indicated in dotted lines at 85, and the nuts 73 are screwed down upon the threads 74 to reduce the space between the heads 35 and 36 and thereby compensate for the foreshortening of the tube 41 as the disposition of the material forming same is altered, whereupon the frame containing the partly finished product is then placed in a steam chamber and the raw rubber vulcanized while the tube 41 is held in distended formation by the interior air pressure, thus permanently setting the tube in corrugated form.

As will be perceived, this method eliminates the necessity of resorting to the use of molds in the making of the extensible tube.

In Fig. 5 of the drawing is shown a form of head for the expansible elements suitable to use under high pressure conditions. Within the cup 37 I employ a floating ring 75 acting between a disc 76 and surrounding a stud 77 provided with a nut 78, mounted upon the disc 76 and acting as a securing means. The end 79 of the tube 30 is placed under the ring 75 and a layer of raw rubber 80 is placed between the ring 75 and the disc 76. Upon the application of pressure by drawing up the nut 78, the end 79 is clamped between the edges of the ring 75 and the wall 38 of the cup and the rubber 80 situated between the disc 76 and the ring 75 is forced out against the tube walls and adheres thereto upon vulcanizing and forms an additional precaution against leakage, while the manner in which the edge of the ring 75 depresses into the material forming the end 79 securely holds the same in place.

I claim as my invention:

In a shock absorber, the combination of: a flexible member having corrugations about the outer surface thereof; means for applying pressure to each end of said flexible member; a rigid metal member surrounding said flexible member and rings fitting loosely inside said metal member, and engaging said corrugations in said flexible member at the base of said corrugations, said rings acting to accurately space said flexible member in said metal member and prevent wear on the outside of said flexible member due to its coming in contact with said metal member, the rings being of substantially L shaped cross section each consisting of a flange fitting down into said corrugations and a bearing portion fitting inside said metal member and rubbing against the internal surface thereof, the bearing portions of said rings forming an interrupted metal wall surrounding and protecting said flexible member and moving therewith.

In testimony whereof, I have hereunto set my hand at Los Angeles, California, this 27th day of August, 1921.

BRUCE BURNS.